United States Patent
Wu

(10) Patent No.: US 11,499,584 B2
(45) Date of Patent: Nov. 15, 2022

(54) JOINT DEVICE FOR SCREW AND NUT

(71) Applicant: Yi-Chang Wu, Taoyuan (TW)

(72) Inventor: Yi-Chang Wu, Taoyuan (TW)

(*) Notice: Subject to any disclaimer, the term of this patent is extended or adjusted under 35 U.S.C. 154(b) by 230 days.

(21) Appl. No.: 16/654,100

(22) Filed: Oct. 16, 2019

(65) Prior Publication Data
US 2021/0062853 A1 Mar. 4, 2021

(30) Foreign Application Priority Data
Aug. 26, 2019 (TW) .................. 108130449

(51) Int. Cl.
| | | |
|---|---|---|
| *F16B 37/08* | (2006.01) | |
| *F16B 33/00* | (2006.01) | |
| *F16B 35/00* | (2006.01) | |

(52) U.S. Cl.
CPC ............ *F16B 33/006* (2013.01); *F16B 35/00* (2013.01); *F16B 37/08* (2013.01); *F16B 37/0892* (2013.01)

(58) Field of Classification Search
CPC .......................... F16B 37/0885; F16B 37/0892
USPC .................................. 411/268, 269
See application file for complete search history.

(56) References Cited

U.S. PATENT DOCUMENTS

| | | | | |
|---|---|---|---|---|
| 1,081,239 A * | 12/1913 | Lantz | ............... | F16B 39/36 411/266 |
| 3,054,145 A * | 9/1962 | Helpa | ............... | B29C 45/2618 264/318 |
| 4,657,458 A * | 4/1987 | Wollar | ............... | F16B 37/043 411/182 |
| 4,784,412 A * | 11/1988 | Van Dongen | ....... | F16L 19/0231 285/133.4 |
| 4,901,958 A * | 2/1990 | Kelso | ............... | F16L 3/11 248/59 |
| 5,039,266 A * | 8/1991 | Nagayoshi | ......... | F16B 37/0892 411/433 |
| 5,199,675 A * | 4/1993 | DeGuchi | ............ | F16B 37/0885 248/59 |
| 5,711,645 A * | 1/1998 | Sanbonmatsu | ..... | F16B 37/0864 411/267 |
| 5,921,734 A * | 7/1999 | Kataoka | ............. | F16B 37/0892 411/269 |

(Continued)

FOREIGN PATENT DOCUMENTS

| | | |
|---|---|---|
| JP | H08145031 A | 6/1996 |
| JP | H1162940 A | 3/1999 |

(Continued)

*Primary Examiner* — Flemming Saether
(74) *Attorney, Agent, or Firm* — Bacon & Thomas, PLLC

(57) ABSTRACT

A joint device for screw and nut includes a first body and a second body. The first body is provided with a plurality of first internal threads, of first external threads, and a first protrusion. The first protrusion is extended with a first engaging portion. The second body is provided with a plurality of second internal threads, of second external threads, and a second protrusion. The second protrusion is extended with a second engaging portion, such that the first protrusion and the second protrusion can be engaged with each other. When in a joining status, the first engaging portion and the second engaging portion are engaged with each other, such that the first body and the second body are folded up and around the screw. The nut can therefore screw up the first body and the second body correspondingly.

5 Claims, 16 Drawing Sheets

(56) References Cited

U.S. PATENT DOCUMENTS 8,794,892 B1 * 8/2014 Doyle .................. F16B 37/0892
411/433

FOREIGN PATENT DOCUMENTS

| JP | 3151014 U | 6/2009 |
| JP | 2012177466 A | 9/2012 |

* cited by examiner

JOINT DEVICE FOR SCREW AND NUT

BACKGROUND OF THE INVENTION

1. Field of the Invention

The present invention relates to a joint device for screw and nut, more particularly, to a joint device for screw and nut adapted for joining screws and nuts.

2. Description of Related Art

In view of the fact that, conventionally, the screw-fastening measure for joining a nut and a screw falls in threading engagement of the nut from an end of the screw to, slowly, a designated place of the screw. However, when in use of the screw having a significant length, the work of threading engagement of the nut to a designated place of the screw would be time and labor consuming.

Given the above, with a spirit of aggressive innovation to overcome the shortages inherent in the nut and screw as mentioned above, a "Joint Device for Screw and Nut" is conceptualized. As such, with persistent research and experiments, the present invention can be accomplished eventually.

SUMMARY OF THE INVENTION

An object of the present invention is to provide a joint device for screw and nut, such that although merely a single component is added in between a screw and a nut, operation can be more time and labor saving, and the nut can be fixed rapidly to an optional place of the screw, without being limited by the length of the screw, but having merits in speediness, labor saving, vibration proof, and antirust.

To achieve the above-mentioned object, the joint device for screw and nut comprises a first body and a second body. The first body is provided with a plurality of first internal threads, of first external threads, and a first protrusion. The first internal threads can each correspond to, and engage with a screw; whereas the first external threads can each correspond to, and engage with the nut. The first protrusion is extended with a first engaging portion. The second body is provided with a plurality of second internal threads, of second external threads, and a second protrusion. The second internal threads can each correspond to, and engage with the screw; whereas the second external threads can each correspond to, and engage with the nut. The second protrusion is extended with a second engaging portion, such that the first protrusion and the second protrusion can be engaged with each other.

According to the present invention, when in a joining status, the first engaging portion and the second engaging portion are engaged with each other, such that the first body and the second body are folded up and around the screw. The nut can therefore screw up the first body and the second body correspondingly. Through the above design, when in the case of a longer screw, one can fold up the first body and the second body directly on a designated place on the screw, where the first engaging portion and the second engaging portion are engaged with each other. As such, the nut can be screwed up on the first body and the second body directly, so as to enhance convenience in use effectively.

Further, according to the present invention, when in a disjoining status, the first engaging portion is disengaged from the second engaging portion, so that the first body and the second body disjoin from the screw. As such, so long as the nut is disengaged from the joint device, the nut can disjoin from the screw, rather than going through multiple threads of the screw. The present invention indeed relates to an innovation for saving time and labor.

Still further, according to the present invention, the first body and the second body may be made into an integral structure, such that through molding into one piece, the cost can be effectively reduced.

According to the present invention, the first body and the second body may be made of plastic materials having high formability and able to be used repeatedly, and less possibility to be fractured into halves. Or alternatively, the first body and the second body may be made of metallic materials which are sturdy and durable, rather than being broken easily.

Further, according to the present invention, the first engaging portion may relate to an engaging hook, and that the second engaging portion may relate to an engaging hook as well. As such, the first engaging portion and the second engaging portion may be engaged with each other through mutual engagement of the engaging hooks. This will make the joint device and the screw match and threadedly engage with each other.

Still further, according to the present invention, the first protrusion may further include a first cutting edge, and that the second protrusion may further include a second cutting edge. Through the first cutting edge and the second cutting edge, when the nut is to be disengaged from the joint device, catch points are provided for a pair of pliers to clamp on the joint device so as to facilitate unscrewing the nut.

According to the present invention, the first external threads and the second external threads may relate to taper threads. As such, the external threads are not limited to be of straight threads, but instead, can be of taper threads.

Further, according to the present invention, the first protrusion may be provided with a first cable tie hole; and that the second protrusion may be provided with a second cable tie hole. As such, through the first cable tie hole and the second cable tie hole, together with usage of cable ties, two screws of different locations can be fastened and secured.

The abovementioned brief description and the following detailed description are for the purpose of exemplification, and for a further explanation of the claims, and that it is understood that other objects, advantages, and novel features of the present invention will become more apparent from the following description when taken in conjunction with the accompanying drawings.

DETAILED DESCRIPTION OF THE PREFERRED EMBODIMENTS

Figure 1:
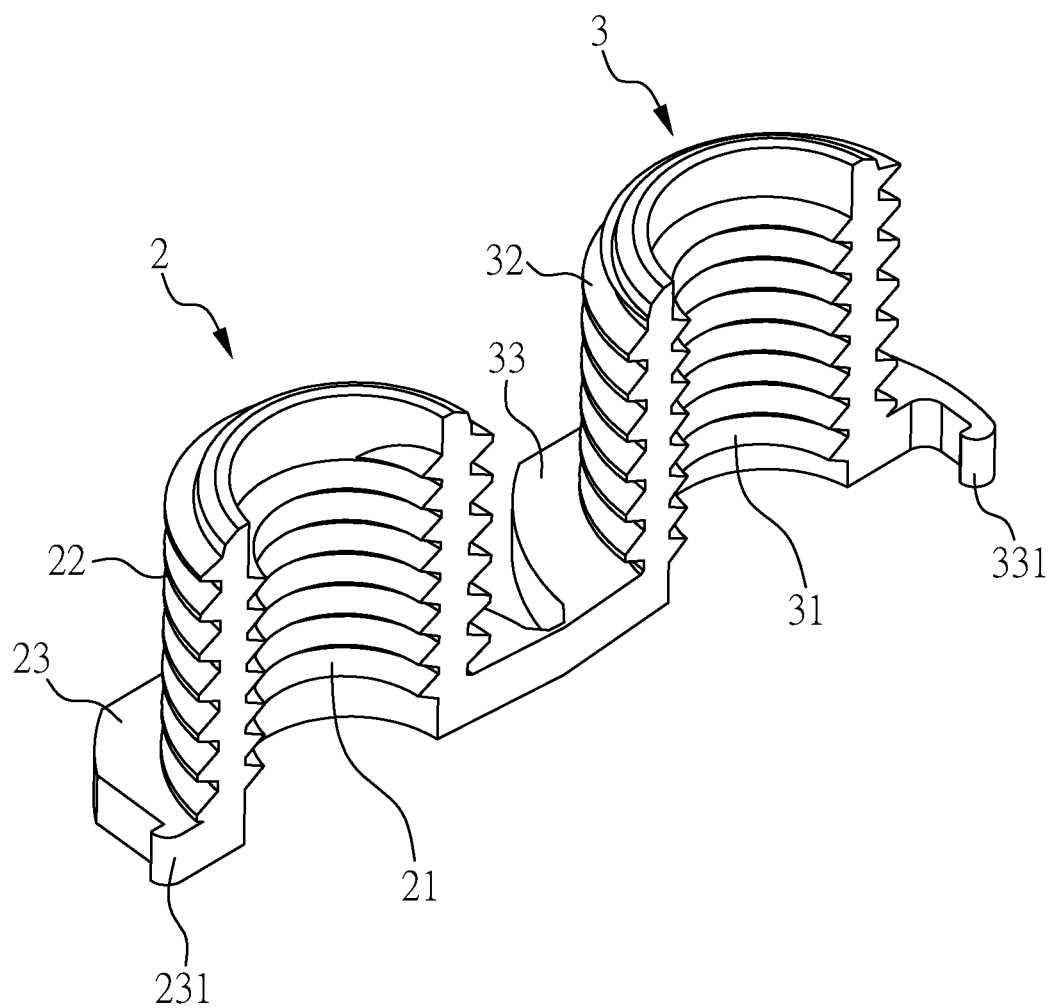
FIG. 1 is a perspective view illustrating a joint device for screw and nut according to a first embodiment of the present invention.
Figure 2:
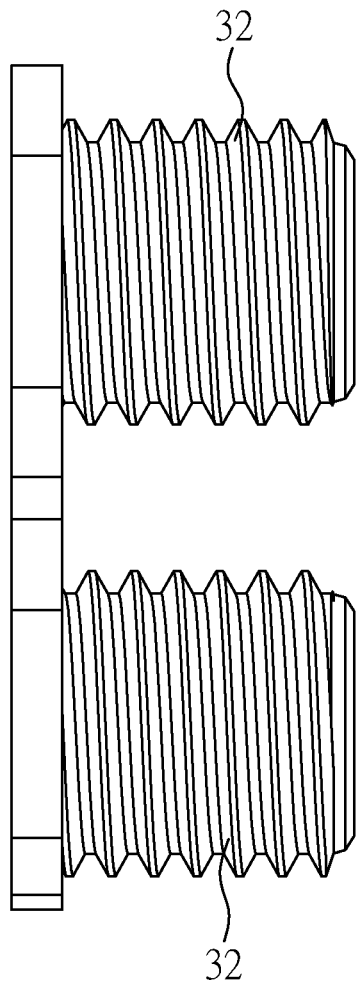
FIG. 2 is a side view illustrating the joint device for screw and nut according to the first embodiment of the present invention.
Figure 3:
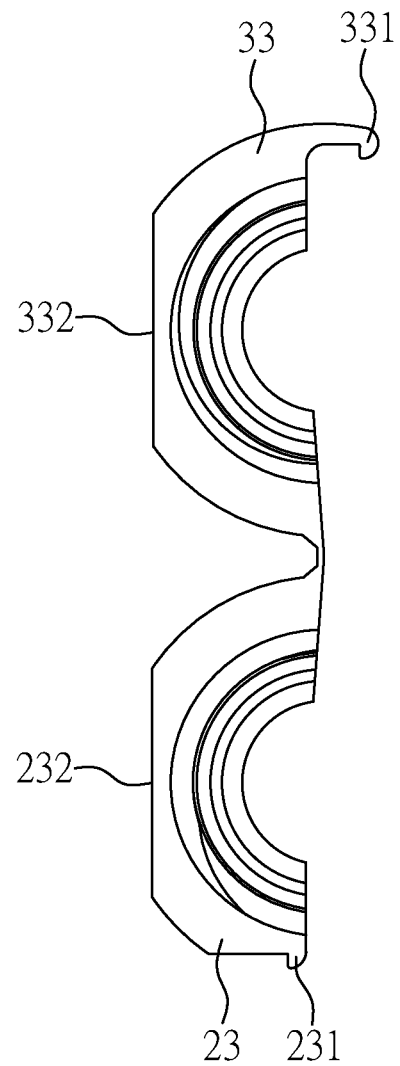
FIG. 3 is a top view illustrating the joint device for screw and nut according to the first embodiment of the present invention.
Figure 4:
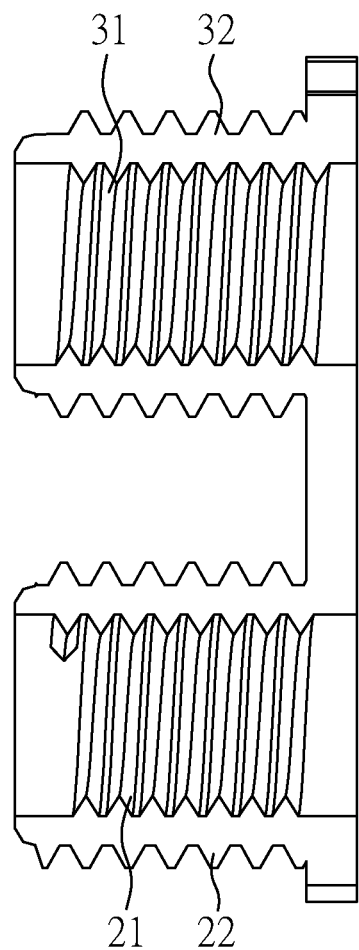
FIG. 4 is a cross-sectional view illustrating the joint device for screw and nut according to the first embodiment of the present invention.

References are made to FIG. 1, a perspective view illustrating a joint device for screw and nut according to a first embodiment of the present invention; FIG. 2, a side view illustrating the joint device for screw and nut; FIG. 3, a top view illustrating the joint device for screw and nut; and FIG. 4, a cross-sectional view-illustrating the joint device for screw and nut. The joint device 1 for joining the screw 11 and the nut 12 (see FIG. 7) comprises a first body 2 and a second body 3, having merits in wrapping directly the first body 2 and the second body 3 around the screw 11 at a to-be-threadedly engaged-place when the screw 11 is significantly long. This will allow the nut 12 to be threadedly engaged on the first body 2 and the second body 3 directly, so as to threadedly engage the nut 12 onto a designated place rapidly and to enhance convenience in use effectively. According to the present invention, the first body 2 and the second body 3 are made of, but not limited to, plastic materials having high formability and able to be used repeatedly, and less possibility to be fractured into halves. Or alternatively, the first body 2 and the second body 3 may be made of metallic materials which are sturdy and durable, rather than being broken easily.

In the first embodiment of the present invention, the first body 2 is provided with a plurality of first internal threads 21, of first external threads 22, and a first protrusion 23. The first internal threads 21 can each correspond to, and engage with the screw 11; whereas the first external threads 22 can each correspond to, and engage with the nut 12. The first protrusion 23 is extended with a first engaging portion 231, and has a first cutting edge 232. When the nut 12 is to be disengaged from the joint device 1, catch points are provided for a pair of pliers to clamp on the joint device 1 so as to facilitate unscrewing the nut 12. Besides, the first engaging portion 231 relates to an engaging hook for securing the first body 2 and the second body 3 together by means of engaging each other.

Further, in the first embodiment, the second body 3 is provided with a plurality of second internal threads 31, of second external threads 32, and a second protrusion 33. The second internal threads 31 can each correspond to, and engage with the screw 11; whereas the second external threads 32 can each correspond to, and engage with the nut 12. The second protrusion 33 is extended with a second engaging portion 331, and has a second cutting edge 332. When the nut 12 is to be disengaged from the joint device 1, catch points are provided for a pair of pliers to clamp on the joint device 1 so as to facilitate unscrewing the nut 12. Besides, the second engaging portion 331 relates to an engaging hook for securing the first body 2 and the second body 3 together by means of engaging each other. In the first embodiment, the first body 2 and the second body 3 are made into an integral structure, where the second protrusion 33 at one end thereof and the first protrusion 23 at one end thereof are connected with each other, by means of molding into one piece, so as to effectively cost down.

Figure 5:
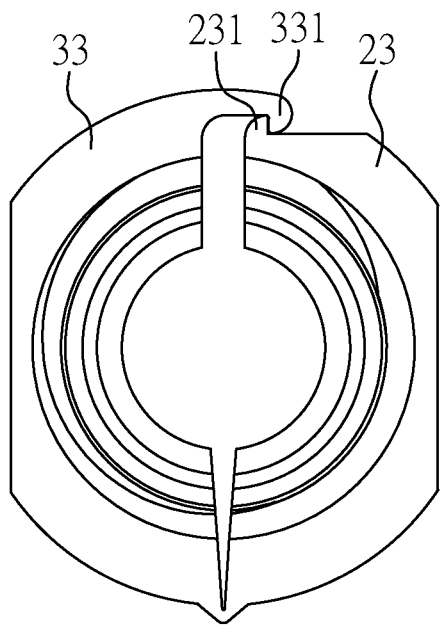
FIG. 5 is a top view illustrating the joint device fir screw and nut, in a joining status, according to the first embodiment of the present invention.

Further referring to FIG. 5, a top view illustrating the joint device for screw and nut, when in a joining status, according to the first embodiment of the present invention, the first body 2 and the second body 3 are folded up at their junctions thereof, such that the first engaging portion 231 and the second engaging portion 331 are engaged with each other, and that an internal space are thus formed for receiving the screw 11. In contrast, as shown in FIG. 3, under the circumstance that the first body 2 and the second body 3 are disengaged from each other, the first engaging portion 231 is disengaged from the second engaging portion 331, so that the first body 2 and the second body 3 are recovered from a joining status to an initial disjoining status.

Figure 6:
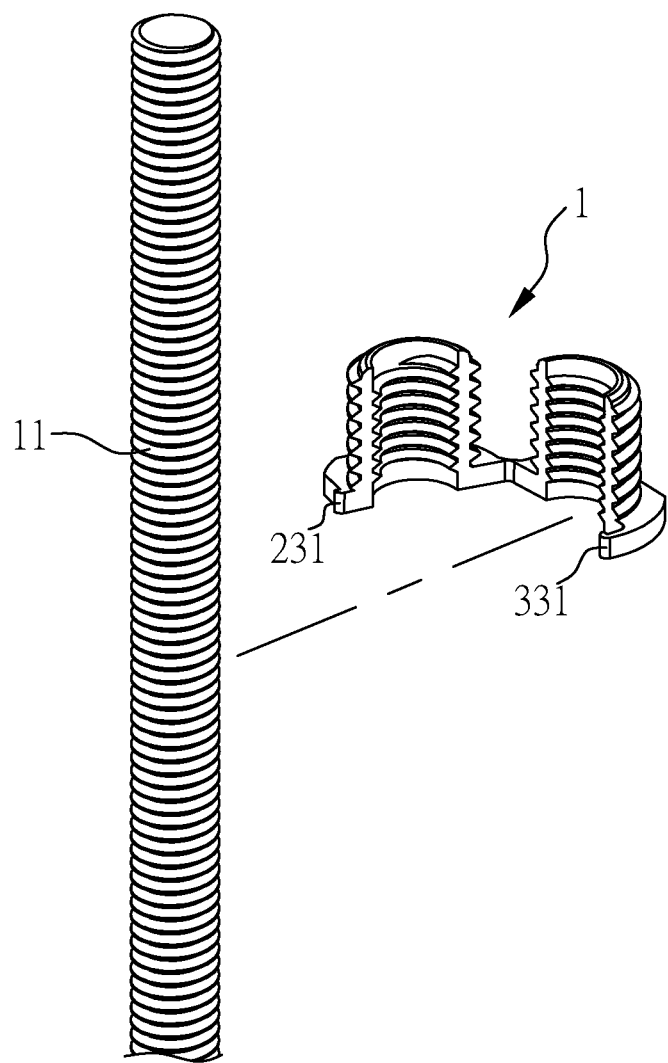
FIG. 6 to FIG. 8 are schematic views illustrating the joint device for screw and nut, in steps of joining together thereof, according to the first embodiment of the present invention.
Figure 7:
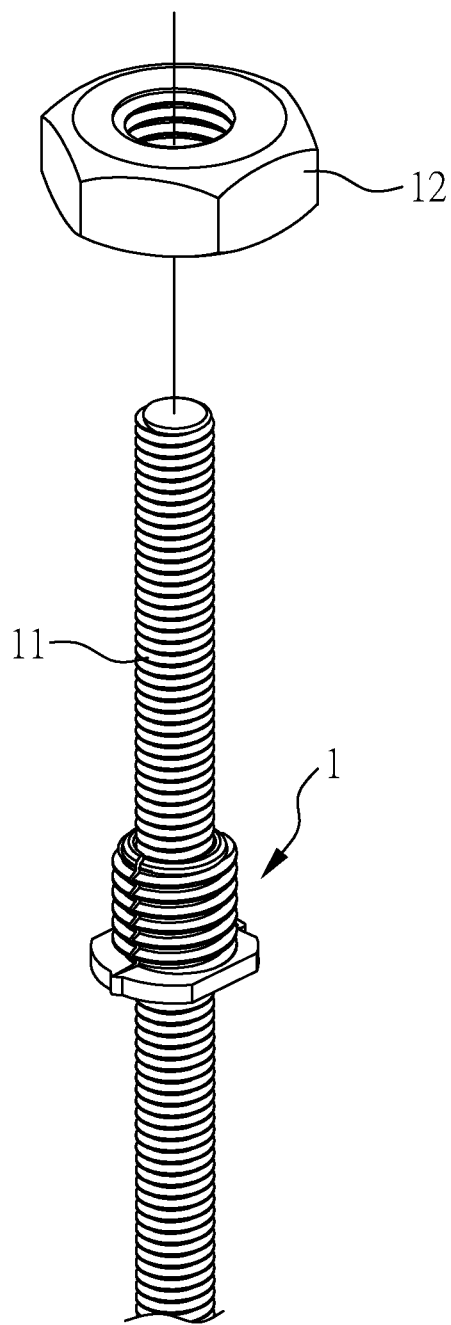
Figure 8:
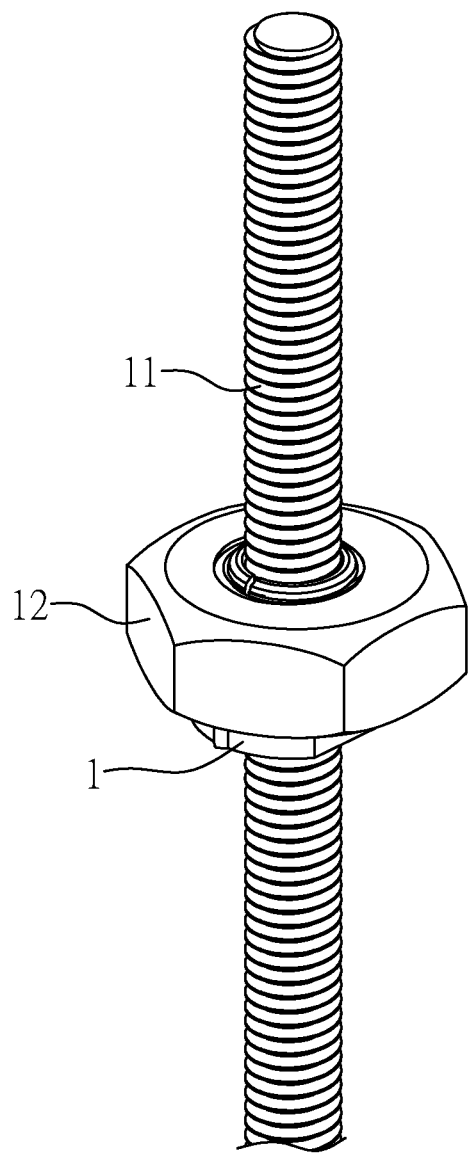

Still further, for an aspect of practical use, references are made from FIG. 6 to FIG. 8, schematic views illustrating the joint device for screw and nut, in steps of joining together thereof, according to the first embodiment of the present invention. As shown in FIG. 6, when in the case of a longer screw 11, such as a ceiling screw 11 which can be longer than one mete and if one would not wish to screw up the nut 12 slowly, from both ends of the screw 11, to a designated place on the screw 11, the joint device 1 can be the choice. Namely, the first engaging portion 231 and the second engaging portion 331 can be engaged with each other directly on the designated place on the screw 11. Further, as shown in FIG. 7, after such engagement, the nut 12 can be screwed directly on the screw 11, and in view of the fact that the internal diameter of the nut 12 conforms with the external diameter of the joint device 1, the internal diameter of the nut 12 is greater than the external diameter of the screw 11. As such, the nut 12 can be engaged directly on the first external threads 22 and on the second external threads 32, so as to avoid excessive strokes of screwing engagement, and to achieve the purpose of saving time and labor. Still further, as shown in FIG. 8, after screwing engagement of the nut 12 with the joint device 1, a fine tune for the screw 11 can still made so as to reach to a predetermined designated place on the screw 11.

Figure 9:
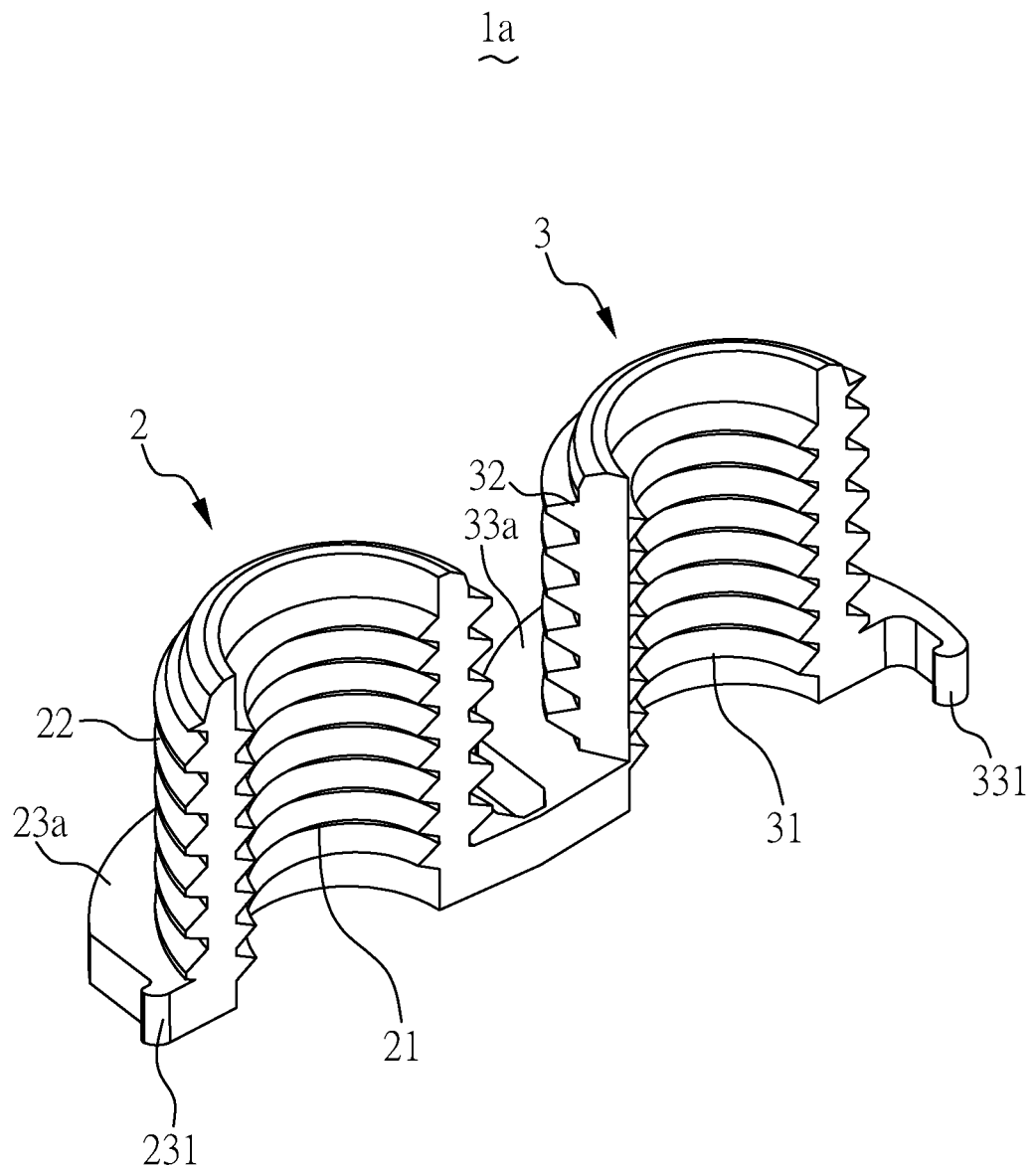
FIG. 9 is a perspective view illustrating a joint device for screw and nut according to a second embodiment of the present invention.
Figure 10:
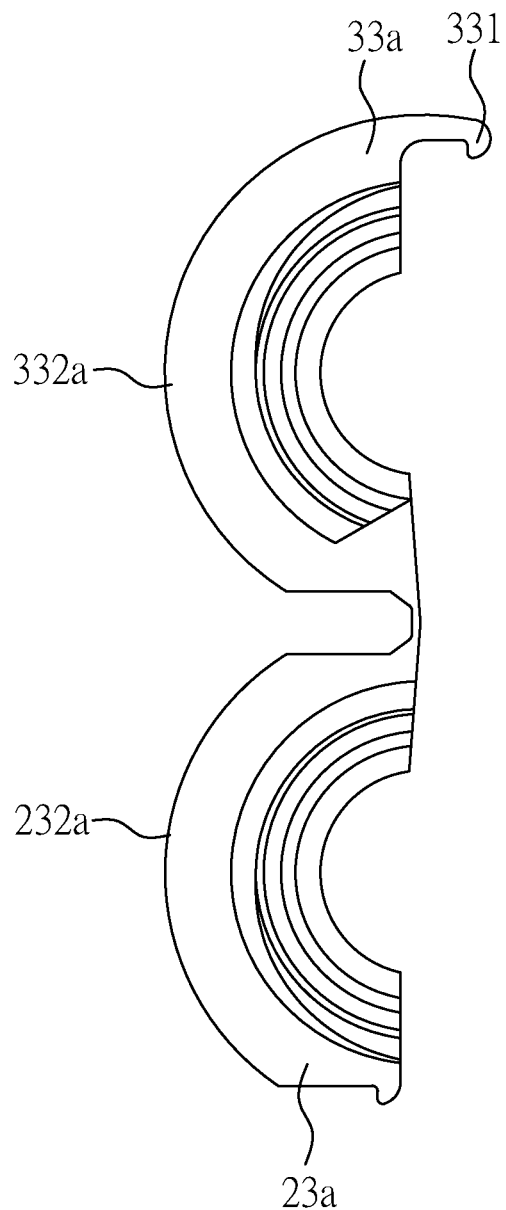
FIG. 10 is a top view illustrating the joint device for screw and nut according to the second embodiment of the present invention.

Now references are made to FIG. 9, a perspective view illustrating a joint device for screw and nut according to a second embodiment of the present invention; and FIG. 10, a top view illustrating the joint device for screw and nut. In the second embodiment, a joint device 1a is substantially similar to the joint device 1a of the first embodiment, except that in the second embodiment, a first protrusion 23a and a second protrusion 33a are not limited to have profiles including a first cutting edge 232 and a second cutting edge 332, or alternatively other profiles, such that in the second embodiment, arc-shaped configurations (a first arc-shaped surface 232a and a second arc-shaped surface 332a) can provide more aspects of utility.

Figure 11:
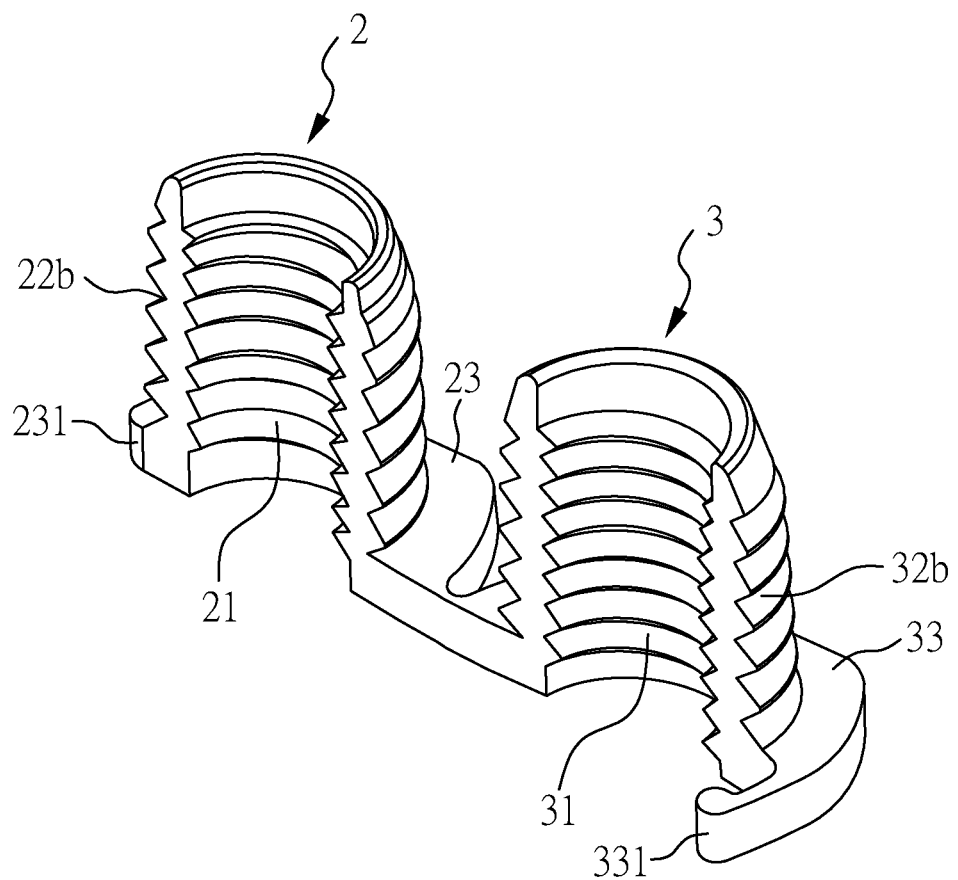
FIG. 11 is a perspective view illustrating a joint device for screw and nut according to a third embodiment of the present invention.
Figure 12:
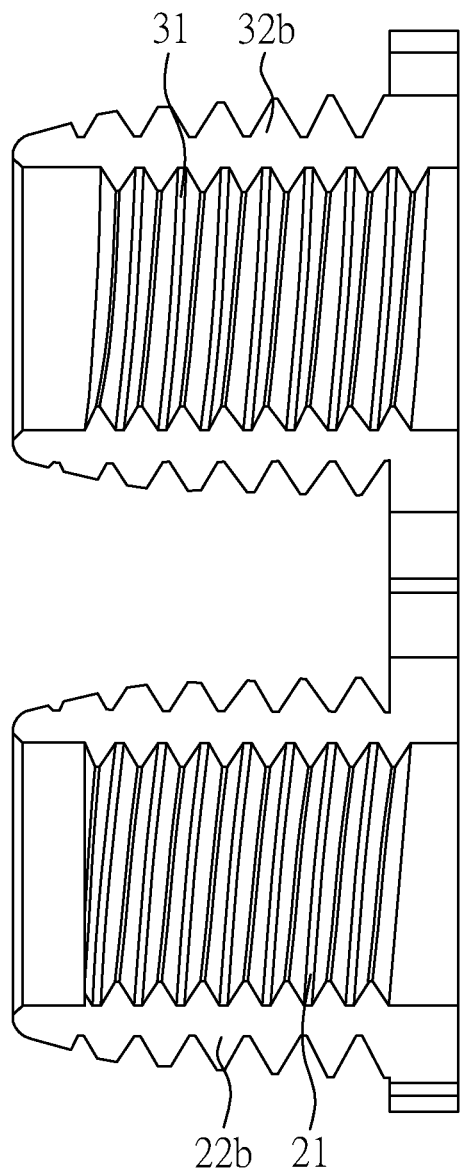
FIG. 12 is a cross-sectional view illustrating the joint device for screw and nut according to the third embodiment of the present invention.

Further references are made to FIG. 11, a perspective view illustrating a joint device for screw and nut according to a third embodiment of the present invention; and FIG. 12, a cross-sectional view illustrating the joint device for screw and nut. In the third embodiment, a joint device 1b is substantially similar to the joint device 1 of the first embodiment, except that in the third embodiment, first external threads 22b and second external threads 32b relate to taper threads, in contrast to straight threads of the first external threads 22 in the first embodiment, having various external diameters for different threads.

Figure 13:
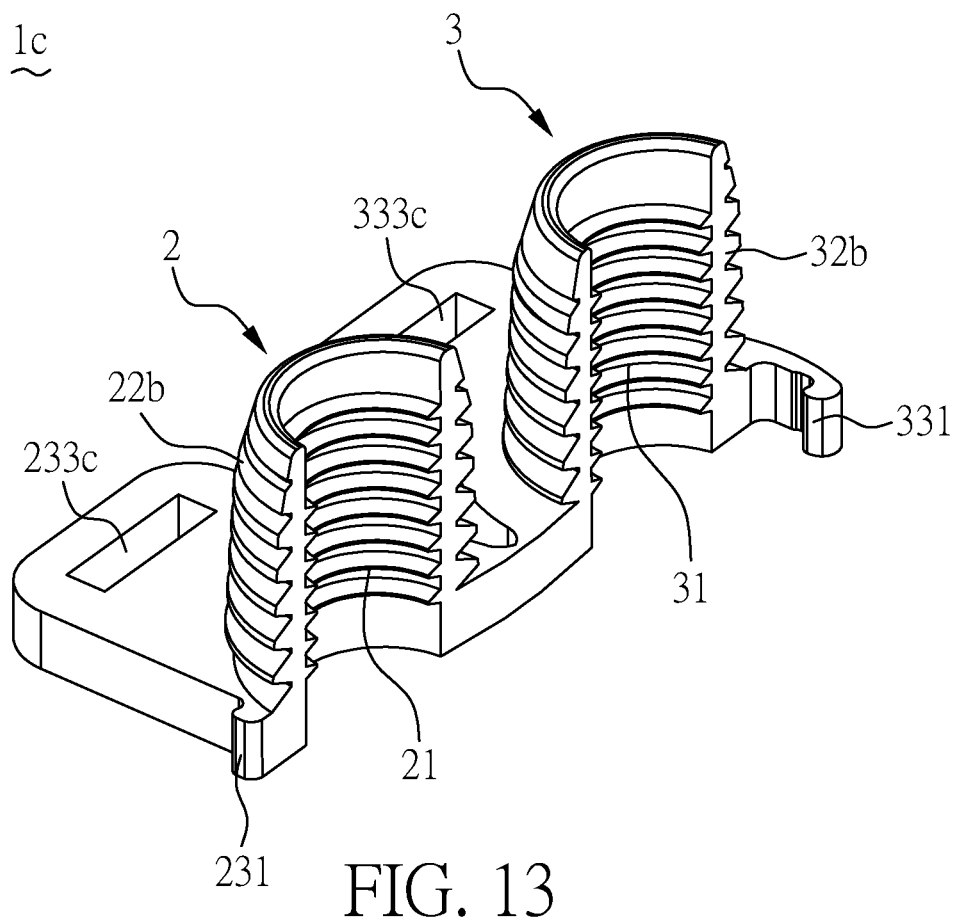
FIG. 13 is a perspective view illustrating a joint device for screw and nut according to a fourth embodiment of the present invention.
Figure 14:
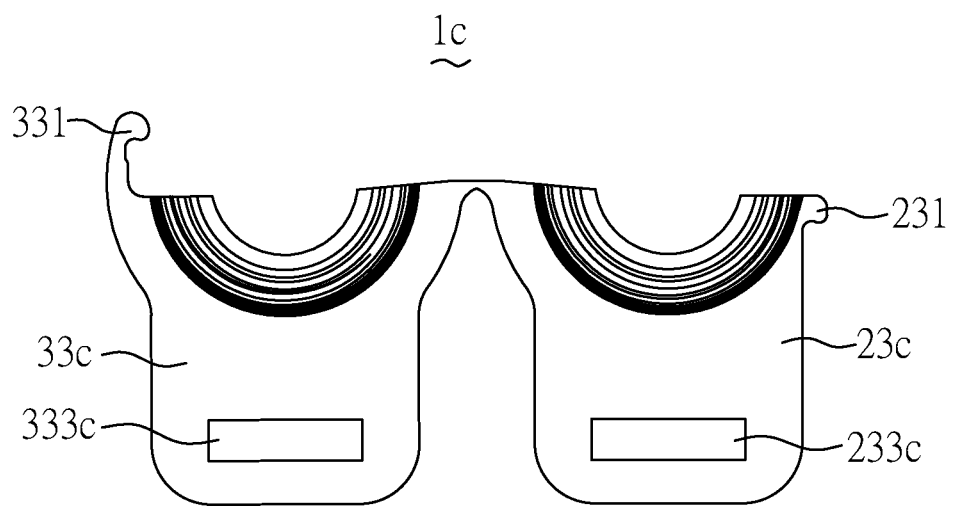
FIG. 14 is a top view illustrating the joint device for screw and nut according to the fourth embodiment of the present invention.
Figure 15:
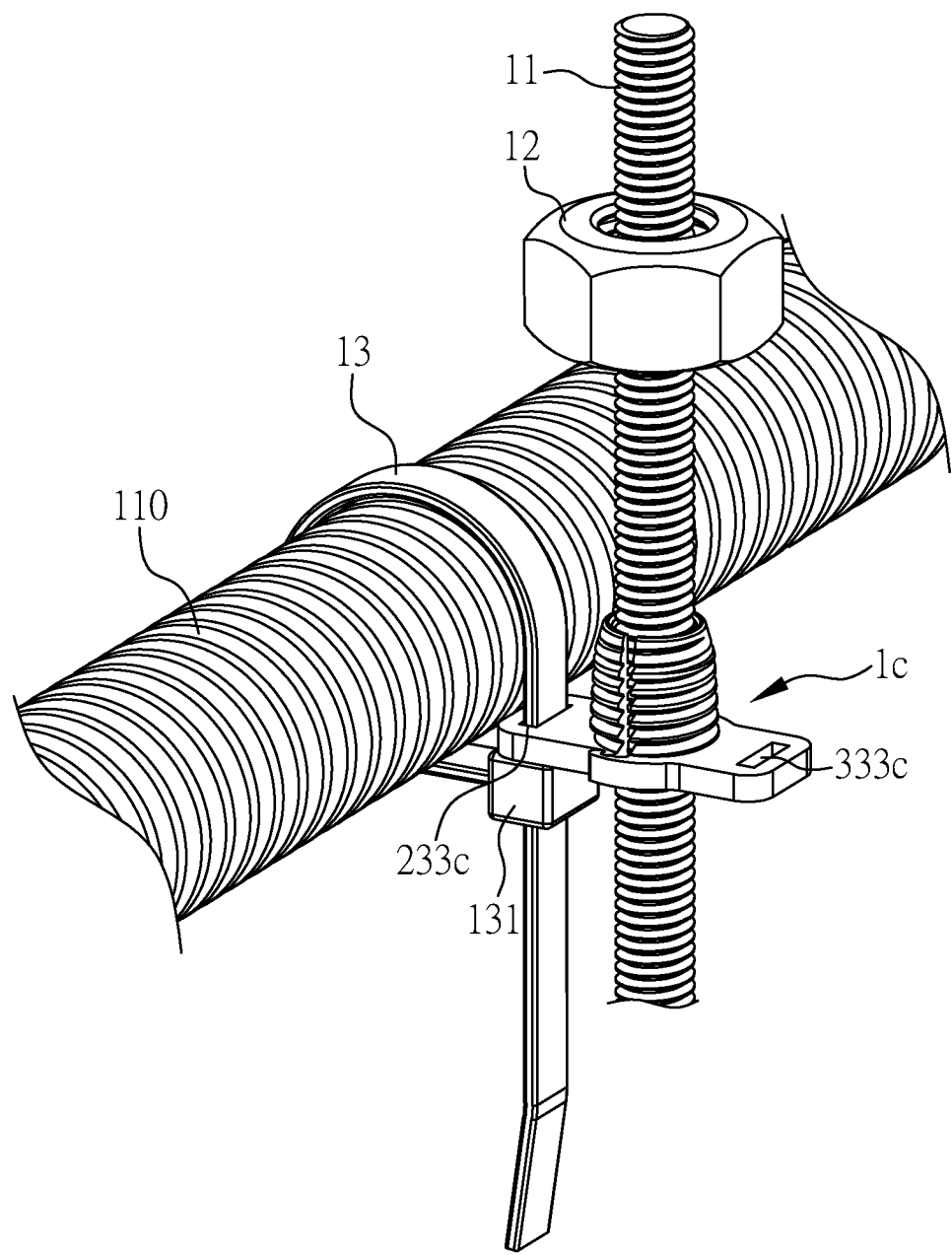
FIG. 15 and FIG. 16 are schematic views illustrating the joint device for screw and nut, in steps of joining together thereof, according to the fourth embodiment of the present invention.
Figure 16:
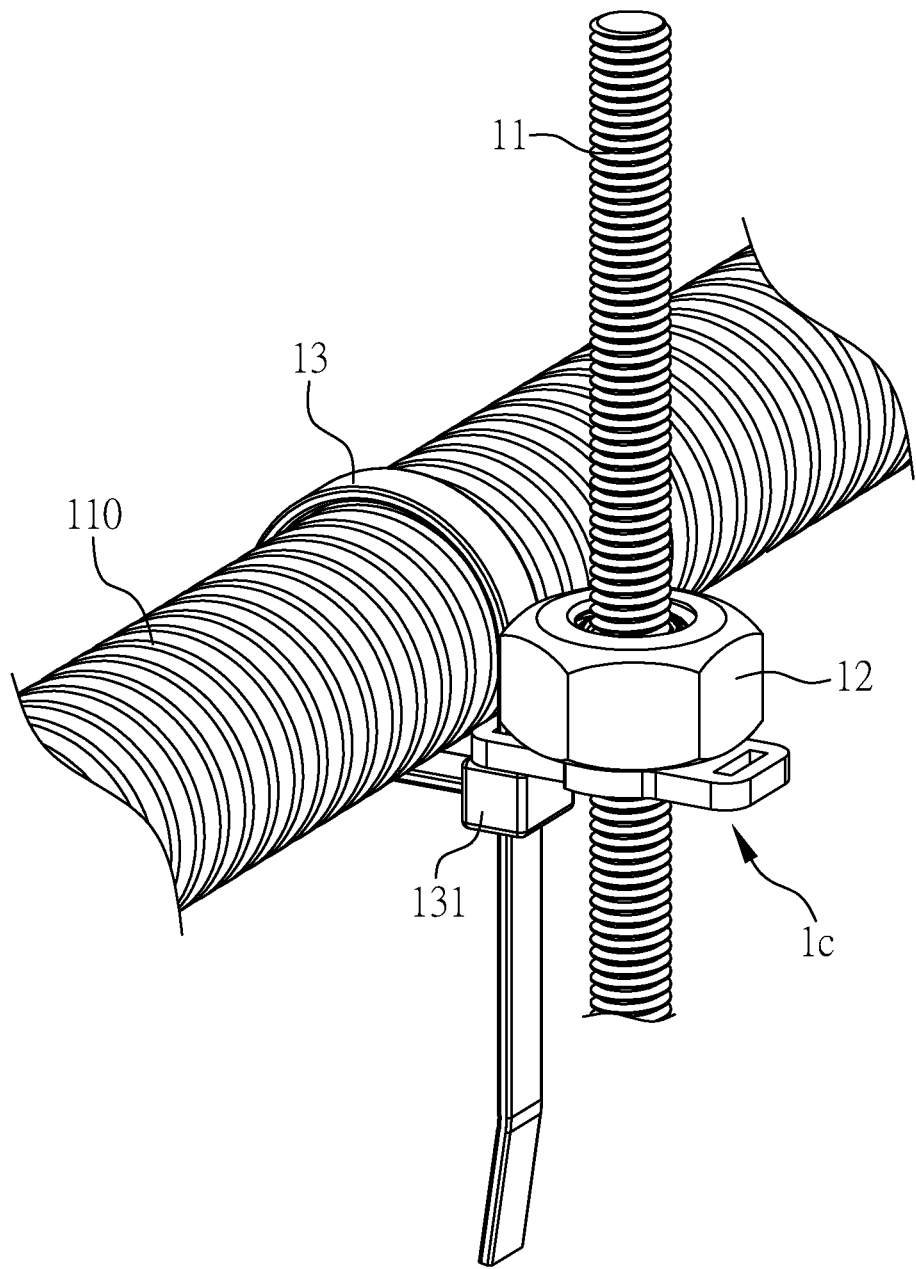

Still further references are made to FIG. 13, a perspective view illustrating a joint device for screw and nut according to a fourth embodiment of the present invention; and FIG. 14, a top view illustrating the joint device for screw and nut. In the fourth embodiment, a joint device 1c is substantially similar to the joint device 1b of the third embodiment, except that in the fourth embodiment, a first protrusion 23c and a second protrusion 33c are provided with a first cable tie hole 233c and a second cable tie hole 333c. Also references are made to FIG. 15 and FIG. 16, schematic views illustrating the joint device for screw and nut, in steps of joining together, according to the fourth embodiment of the present invention. Through the first cable tie hole 233c and the second cable tie hole 333c, in cooperation of a cable tie 13, two screws 11, 110 of different locations can be fastened and secured. In the fourth embodiment, the joint device 1c has joining steps similar to those of the joint device 1 of the first embodiment, except that in the fourth embodiment, when the cable tie 13 passes through the first cable tie hole 233c, the cable tie 13 will tie and fasten the screw 110, and that a cable tie holder 131 will then secure the cable tie 13. This accomplishes the requirement of joining different screws 11, 110.

Figure 17:
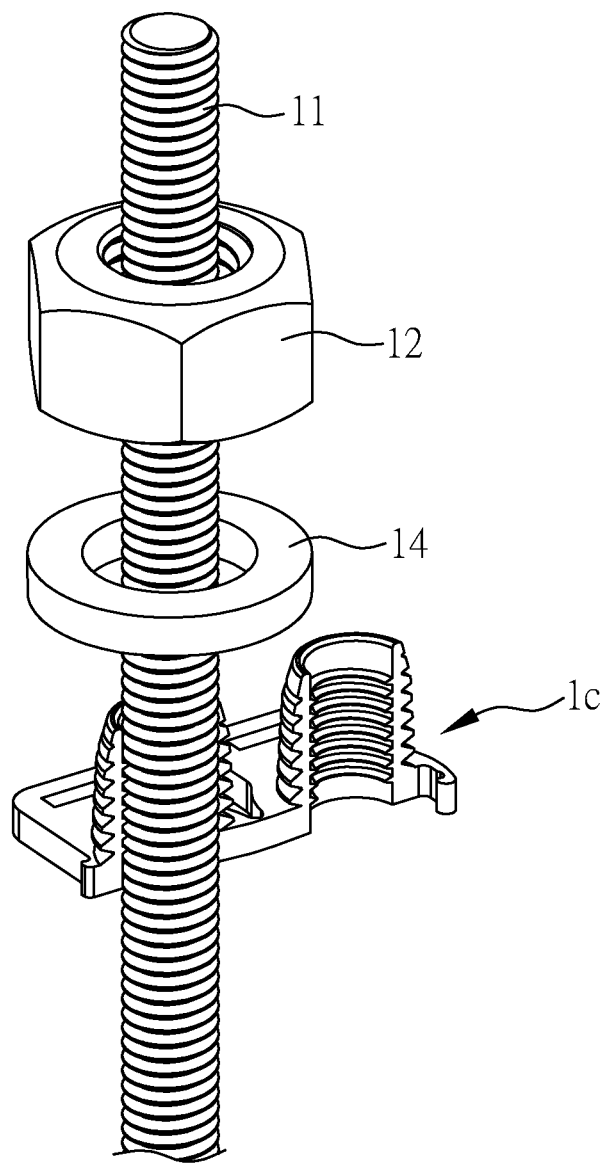
FIG. 17 and FIG. 18 are schematic views illustrating the joint device for screw and nut, in other steps of joining together thereof according to the fourth embodiment of the present invention.
Figure 18:
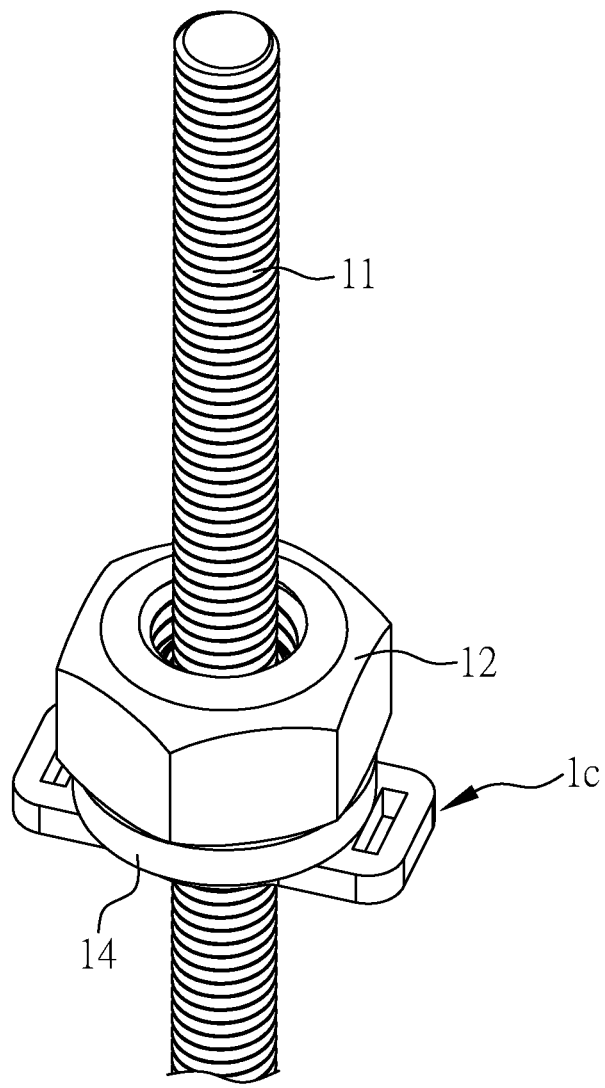

Now references are made to FIG. 17 and FIG. 18, schematic views illustrating the joint device for screw and nut, in other steps of joining together, according to the fourth embodiment of the present invention. As shown, the joint device 1c has joining steps similar to those of the joint device 1 of the first embodiment, except that in the fourth embodiment, prior to screwing up the nut 12, a washer 14, or other elements for tightening, can be sleeved in so as to tighten the fastening. This can, therefore, sat various demands.

Although the present invention has been explained in relation to its preferred embodiments, it is to be understood that many other possible modifications and variations can be made without departing from the scope of the invention as hereinafter claimed.

What is claimed is:

1. A joint device for screw and nut, comprising:
    a first body, provided with a plurality of first internal threads, of first external threads, and a first protrusion, wherein the first internal threads can each correspond to, and engage with a screw, and the first external threads can each correspond to, and engage with a nut, and the first protrusion is extended with a first engaging portion, wherein the first engaging portion relates to an engaging hook with a first part extending along a first direction; and
    a second body, provided with a plurality of second internal threads, of second external threads, and a second protrusion, wherein the second internal threads can each correspond to, and engage with the screw, and the second external threads can each correspond to, and engage with the nut, and the second protrusion is extended with a second engaging portion, wherein the second engaging portion relates to another engaging hook with a second part extending along the first direction and a third part extending along a second direction, the first direction being perpendicular to the second direction;
    wherein, when in a joining status, the first engaging portion and the second engaging portion are engaged with each other, such that the first body and the second body are folded up and around the screw, and the nut can therefore screw up the first body and the second body correspondingly, wherein the first body and the second body are made into an integral structure molding into one piece;
    wherein the first protrusion is provided with a first cable tie hole, and the second protrusion is provided with a second cable tie hole.

2. The joint device for screw and nut as claimed in claim 1, wherein when in a disjoining status, the first engaging portion is disengaged from the second engaging portion, so that the first body and the second body disjoin from the screw.

3. The joint device for screw and nut as claimed in claim 1, wherein the first body and the second body are made of plastic materials.

4. The joint device for screw and nut as claimed in claim 1, wherein the first body and the second body are made of metallic materials.

5. The joint device for screw and nut as claimed in claim 1, wherein the first external threads and the second external threads relate to taper threads.

* * * * *